United States Patent
Okamura

(10) Patent No.: US 11,110,402 B2
(45) Date of Patent: Sep. 7, 2021

(54) POROUS HOLLOW FIBER MEMBRANE, METHOD FOR PRODUCING POROUS HOLLOW FIBER MEMBRANE AND FILTRATION METHOD

(71) Applicant: ASAHI KASEI KABUSHIKI KAISHA, Tokyo (JP)

(72) Inventor: Daisuke Okamura, Tokyo (JP)

(73) Assignee: ASAHI KASEI KABUSHIK KASHA, Tokyo (JP)

( * ) Notice: Subject to any disclaimer, the term of this patent is extended or adjusted under 35 U.S.C. 154(b) by 0 days.

(21) Appl. No.: 16/643,041

(22) PCT Filed: Aug. 31, 2018

(86) PCT No.: PCT/JP2018/032464
§ 371 (c)(1),
(2) Date: Feb. 28, 2020

(87) PCT Pub. No.: WO2019/045069
PCT Pub. Date: Mar. 7, 2019

(65) Prior Publication Data
US 2020/0206693 A1  Jul. 2, 2020

(30) Foreign Application Priority Data

Sep. 1, 2017 (JP) ............................. JP2017-168522
Sep. 1, 2017 (JP) ............................. JP2017-168523

(51) Int. Cl.
*B01D 69/08* (2006.01)
*B01D 71/34* (2006.01)
(Continued)

(52) U.S. Cl.
CPC ............. *B01D 69/08* (2013.01); *B01D 71/34* (2013.01); *B01D 71/36* (2013.01); *B01D 71/76* (2013.01);
(Continued)

(58) Field of Classification Search
CPC ........ B01D 69/08; B01D 71/34; B01D 71/76; B01D 71/36; B01D 2323/08;
(Continued)

(56) References Cited

U.S. PATENT DOCUMENTS

2005/0098494 A1   5/2005  Daniel et al.
2007/0172640 A1   7/2007  Nobuharu et al.
(Continued)

FOREIGN PATENT DOCUMENTS

CN    102527250 A    7/2012
CN    102764597 A    11/2012
(Continued)

OTHER PUBLICATIONS

Bo Zhou et al., Preparation of ECTFE membranes with bicontinuous structure via TIPS method by a binary diluent, Desalination and Water Treatment, 2015, p. 17646-17657, vol. 57, No. 38.
(Continued)

*Primary Examiner* — Ellen M McAvoy
(74) *Attorney, Agent, or Firm* — Kenja IP Law PC

(57) ABSTRACT

Provided is a method including the steps of producing a melt-kneaded product and discharging the melt-kneaded product. In the step of producing a melt-kneaded product, a thermoplastic resin, a non-solvent and an inorganic compound are mixed and melt-kneaded, wherein the non-solvent does not uniformly dissolve the thermoplastic resin of one-quarter mass at a boiling point or 250° C., whichever is lower.

22 Claims, 7 Drawing Sheets

(51) Int. Cl.
*B01D 71/36* (2006.01)
*B01D 71/76* (2006.01)
(52) U.S. Cl.
CPC ...... *B01D 2323/08* (2013.01); *B01D 2323/12* (2013.01); *B01D 2323/18* (2013.01); *B01D 2323/20* (2013.01); *B01D 2323/22* (2013.01); *B01D 2325/026* (2013.01); *B01D 2325/20* (2013.01); *B01D 2325/24* (2013.01); *B01D 2325/30* (2013.01)
(58) Field of Classification Search
CPC ............ B01D 2323/12; B01D 2323/18; B01D 2323/22; B01D 2325/24; B01D 2325/30
See application file for complete search history.

(56) References Cited

U.S. PATENT DOCUMENTS

| | | | | |
|---|---|---|---|---|
| 2007/0241050 | A1* | 10/2007 | Tada | B01D 69/08 210/500.23 |
| 2009/0148659 | A1 | 6/2009 | Arata et al. | |
| 2009/0206035 | A1* | 8/2009 | Takahashi | B01D 69/02 210/636 |
| 2009/0297822 | A1* | 12/2009 | Fujimura | B01D 69/087 428/314.2 |
| 2011/0239865 | A1 | 10/2011 | Quan et al. | |
| 2011/0290716 | A1* | 12/2011 | Tada | B29C 48/08 210/500.23 |
| 2012/0103895 | A1* | 5/2012 | Tada | B01D 69/08 210/500.42 |
| 2012/0160764 | A1* | 6/2012 | Tada | B01D 67/0027 210/500.23 |
| 2014/0138304 | A1* | 5/2014 | Shiotani | C08F 214/22 210/500.23 |
| 2016/0023170 | A1* | 1/2016 | Yang | B01D 61/18 210/500.23 |
| 2016/0089638 | A1 | 3/2016 | Oliver et al. | |
| 2016/0121273 | A1* | 5/2016 | Ishiodori | B01D 67/0016 210/500.23 |
| 2016/0325237 | A1* | 11/2016 | Okamura | C02F 1/44 |
| 2019/0022601 | A1* | 1/2019 | Okamura | C08J 9/26 |
| 2019/0314767 | A1* | 10/2019 | Miki | B01D 67/0016 |
| 2020/0246756 | A1* | 8/2020 | Iwai | B01D 69/087 |
| 2020/0353420 | A1* | 11/2020 | Okamura | B01D 71/36 |

FOREIGN PATENT DOCUMENTS

| | | |
|---|---|---|
| EP | 1063256 A1 | 12/2000 |
| EP | 1935480 A1 | 6/2008 |
| EP | 3427818 A1 | 1/2019 |
| JP | H07232042 A | 9/1995 |
| JP | 2005516764 A | 6/2005 |
| JP | 2005193195 A | 7/2005 |
| JP | 2008062227 A | 3/2008 |
| JP | 2011168741 A | 9/2011 |
| JP | 2012040461 A | 3/2012 |
| JP | 2012511413 A | 5/2012 |
| JP | 2016083647 A | 5/2016 |
| JP | 2016523698 A | 8/2016 |
| WO | 2017155004 A1 | 9/2017 |

OTHER PUBLICATIONS

Jian Pan et al., Fabrication and properties of poly(ethylene chlorotrifluoroethylene) membranes via thermally induced phase separation (TIPS), RSC Advances, 2015, p. 45249-45257, vol. 5, No. 56.

Oct. 16, 2020, the Supplementary European Search Report issued by the European Patent Office in the corresponding European Patent Application No. 18849559.2.

Mar. 3, 2020, International Preliminary Report on Patentability issued in the International Patent Application No. PCT/JP2018/032464.

Nov. 27, 2018, International Search Report issued in the International Patent Application No. PCT/JP2018/032464.

* cited by examiner

POROUS HOLLOW FIBER MEMBRANE, METHOD FOR PRODUCING POROUS HOLLOW FIBER MEMBRANE AND FILTRATION METHOD

CROSS-REFERENCE TO RELATED APPLICATION

The present application claims priority to and the benefit of Japanese Patent Application Nos. 2017-168522 and 2017-168523 filed on Sep. 1, 2017, the entire contents of which are incorporated herein by reference.

TECHNICAL FIELD

The present disclosure relates to a porous hollow fiber membrane, a method for producing a porous hollow fiber membrane and a filtration method.

BACKGROUND

Membrane filtration methods using hollow fiber membranes for clarifying a liquid to be treated such as water treatment and sewerage treatment have been widely prevalent. A thermally induced phase separation method is known as a method for producing a hollow fiber membrane used for membrane filtration.

In the thermally induced phase separation method, a thermoplastic resin and an organic liquid are used. In the thermally induced phase separation method in which a solvent that does not dissolve the thermoplastic resin at a room temperature but dissolves the thermoplastic resin at a high temperature, that is, a latent solvent (poor solvent) is used as an organic liquid, after the thermoplastic resin and the organic liquid are kneaded at a high temperature to dissolve the thermoplastic resin in the organic liquid, phase separation is induced by cooling the mixture to the room temperature, and the organic liquid is removed to produce a porous body. This method has the following advantages:
(a) a membrane can be produced from a polymer, such as polyethylene, which has no appropriate solvent capable of dissolving the polymer at a room temperature; and
(b) especially when the thermoplastic resin is a crystalline resin, membrane production through dissolution at a high temperature followed by solidification by cooling promotes crystallization during the membrane production and facilitates obtaining a highly strong membrane.

With the above described advantages, the thermally induced phase separation method is frequently used as a method for producing a porous membrane. However, certain crystalline resins easily become spherocrystal membrane structure, have a high strength but a low elongation and brittle, and thus have a problem with a practical durability. In the disclosed technique, a membrane is produced by using a poor solvent of thermoplastic resin selected from citrate ester (see Patent Literature (PTL) 1).

CITATION LIST

Patent Literature

PTL 1: JP2011168741 (A)

SUMMARY

Technical Problem

However, the membrane produced by the method disclosed in PTL1 has also a problem of having a spherocrystal structure. It is therefore an object of the present disclosure to provide a porous hollow fiber membrane that has a three-dimensional network structure and is excellent in chemical resistance and mechanical strength, a method for producing the porous hollow fiber membrane and a filtration method using the porous hollow fiber membrane.

Solution to Problem

The present disclosure is described below.
[1] A method for producing a porous hollow fiber membrane including the steps of:
  mixing and melt-kneading a thermoplastic resin, a non-solvent that does not uniformly dissolve the thermoplastic resin of one-quarter mass at a boiling point or 250° C., whichever is lower, and an inorganic compound to produce a kneaded product; and
  discharging the kneaded product, wherein
[2] the non-solvent consists of a plurality of solvents.
[3] The method for producing a porous hollow fiber membrane according to [2], wherein
  the solvents contain a first organic liquid and a second organic liquid; and
  in the mixing, the thermoplastic resin, the mixed liquid and the inorganic compound are mixed and melt-kneaded to produce the kneaded product.
[4] The method for producing a porous hollow fiber membrane according to [3], wherein
  the first organic liquid is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils; and
  the second organic liquid is different from the first organic liquid, and is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils.
[5] The method for producing a porous hollow fiber membrane according to [3] or [4], wherein the first organic liquid is a non-solvent that does not uniformly dissolve the thermoplastic resin of one-quarter mass at a boiling point or 250° C., whichever is lower.
[6] The method for producing a porous hollow fiber membrane according to any one of [3] to [5], wherein the second organic liquid is a solvent that uniformly dissolves the thermoplastic resin of one-quarter mass at a boiling point or 250° C., whichever is lower.
[7] The method for producing a porous hollow fiber membrane according to any one of [2] to [6], wherein the thermoplastic resin is a thermoplastic resin that contains, in its molecule, at least one selected from vinylidene fluoride, ethylene, chlorotrifluoroethylene, tetrafluoroethylene, hexafluoropropylene and vinyl fluoride.
[8] The method for producing a porous hollow fiber membrane according to any one of [1] to [7], wherein the inorganic compound is at least one selected from silica, lithium chloride and titanium oxide.
[9] The method for producing a porous hollow fiber membrane according to [1], wherein the non-solvent is a single solvent.
[10] The method for producing a porous hollow fiber membrane according to [9], wherein the non-solvent is at least one selected from sebacic acid esters, acetyl citric acid esters, citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils.

[11] The method for producing a porous hollow fiber membrane according to [9] or [10], wherein the thermoplastic resin is an ethylene-chlorotrifluoroethylene copolymer.

[12] The method for producing a porous hollow fiber membrane according to [11], wherein the non-solvent is a plasticizer selected from stearic acid esters, phosphoric acid esters and C6-C30 fatty acids.

[13] The method for producing a porous hollow fiber membrane according to any one of [9] to [12], wherein the inorganic compound is at least one selected from silica, lithium chloride and titanium oxide.

[14] The method for producing a porous hollow fiber membrane according to any one of [1] to [13], wherein the thermoplastic resin is a fluorinated thermoplastic resin.

[15] The method for producing a porous hollow fiber membrane according to any one of [1] to [14], wherein the non-solvent is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils.

[16] A porous hollow fiber membrane containing a thermoplastic resin, a solvent and an inorganic compound, wherein the solvent is a non-solvent that does not uniformly dissolve the thermoplastic resin of one-quarter mass at a boiling point or 250° C., whichever is lower.

[17] The porous hollow fiber membrane according to [16], wherein the non-solvent consists of a plurality of solvents.

[18] The porous hollow fiber membrane according to [17], wherein
the solvents contain a first organic liquid and a second organic liquid;
the first organic liquid is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils; and
the second organic liquid is different from the first organic liquid, and is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils.

[19] The porous hollow fiber membrane according to [17] or [18], wherein the first organic liquid is a non-solvent that does not uniformly dissolve the thermoplastic resin of one-quarter mass at a boiling point or 250° C., whichever is lower.

[20] The porous hollow fiber membrane according to any one of [17] to [19], wherein the second organic liquid is a solvent that uniformly dissolves the thermoplastic resin of one-quarter mass at a boiling point or 250° C., whichever is lower.

[21] The porous hollow fiber membrane according to any one of [17] to [20], wherein the thermoplastic resin is a thermoplastic resin that contains, in its molecule, at least one selected from vinylidene fluoride, ethylene, chlorotrifluoroethylene, tetrafluoroethylene, hexafluoropropylene and vinyl fluoride.

[22] The porous hollow fiber membrane according to any one of [17] to [21], wherein the inorganic compound is at least one selected from silica, lithium chloride and titanium oxide.

[23] The porous hollow fiber membrane according to [16], wherein the non-solvent is a single solvent.

[24] The porous hollow fiber membrane according to [23], wherein the non-solvent is at least one selected from sebacic acid esters, acetyl citric acid esters, citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils.

[25] The porous hollow fiber membrane according to [23] or [24], wherein the thermoplastic resin is an ethylene-chlorotrifluoroethylene copolymer.

[26] The porous hollow fiber membrane according to [25], wherein the non-solvent is a plasticizer selected from stearic acid esters, phosphoric acid esters and C6-C30 fatty acids.

[27] The porous hollow fiber membrane according to any one of [23] to [26], wherein the inorganic compound is at least one selected from silica, lithium chloride and titanium oxide.

[28] A porous hollow fiber membrane containing a thermoplastic resin, a solvent and an inorganic compound, wherein
the thermoplastic resin is a thermoplastic resin that contains, in its molecule, at least one selected from vinylidene fluoride, chlorotrifluoroethylene, tetrafluoroethylene, hexafluoropropylene and vinyl fluoride;
the solvent is a non-solvent that does not uniformly dissolve the thermoplastic resin of one-quarter mass at a boiling point; and
a sum of areas of resin portions each having an area of 1 $\mu m^2$ or less is 70% or more to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

[29] A porous hollow fiber membrane containing a thermoplastic resin, a solvent and an inorganic compound, wherein
the thermoplastic resin is a thermoplastic resin that contains, in its molecule, at least one selected from vinylidene fluoride, chlorotrifluoroethylene, tetrafluoroethylene, hexafluoropropylene and vinyl fluoride;
the solvent is a non-solvent that does not uniformly dissolve the thermoplastic resin of one-quarter mass at a boiling point; and
a sum of areas of resin portions each having an area of 10 $\mu m^2$ or more is 15% or less to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

[30] A porous hollow fiber membrane containing a thermoplastic resin, a solvent and an inorganic compound, wherein
the thermoplastic resin is one of ETFE, ECTFE and VDF-TriFE copolymers; and
a sum of areas of resin portions each having an area of 1 $\mu m^2$ or less is 70% or more to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

[31] A porous hollow fiber membrane containing a thermoplastic resin, a solvent and an inorganic compound, wherein
the thermoplastic resin is one of ETFE, ECTFE and VDF-TriFE copolymers; and
a sum of areas of resin portions each having an area of 10 μm² or more is 15% or less to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.
[32] A filtration method of filtering by using a porous hollow fiber membrane according to any one of [16] to [31].

Advantageous Effect

According to this disclosure, a porous hollow fiber membrane that forms a three-dimensional network structure and has an excellent pore forming properties, high chemical resistance and mechanical strength is provided.

DETAILED DESCRIPTION

Embodiments of this disclosure will be described in detail below. It should be noted that this disclosure is not limited to the following embodiments.

<Porous Hollow Fiber Membrane>

Figure 1:
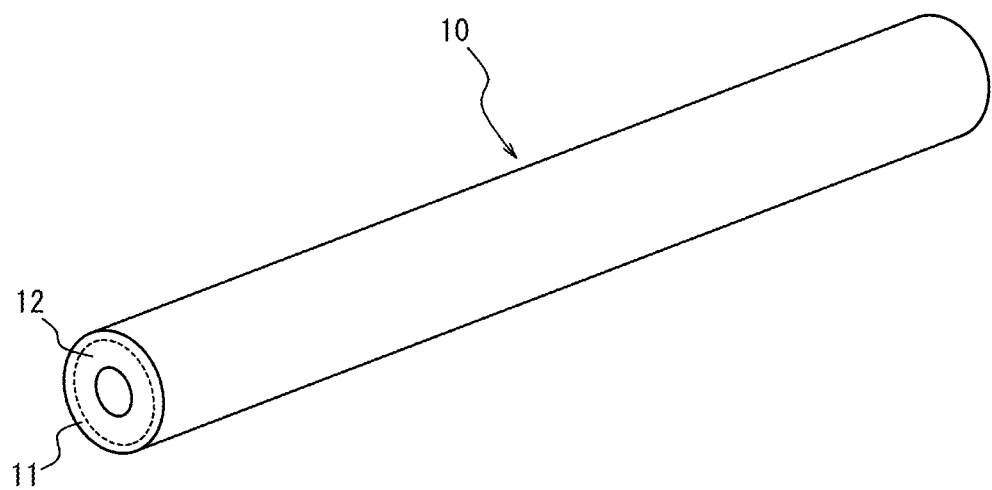
FIG. 1 is an external view of a porous hollow fiber membrane according to an embodiment of this disclosure.

A porous hollow fiber membrane according to this disclosure will be described below. FIG. 1 is an external view of the porous hollow fiber membrane according to this embodiment. A porous hollow fiber membrane 10 includes at least a separation layer 11. The porous hollow fiber membrane 10 may be formed only of the separation layer 11, and may further include a support layer 12. In this embodiment, the porous hollow fiber membrane 10 has the separation layer 11 and the support layer 12. In this embodiment, the support layer 12 is formed on the inner surface side of the porous hollow fiber membrane 10. In this embodiment, the separation layer 11 is formed radially outward of the support layer 12.

Figure 2:
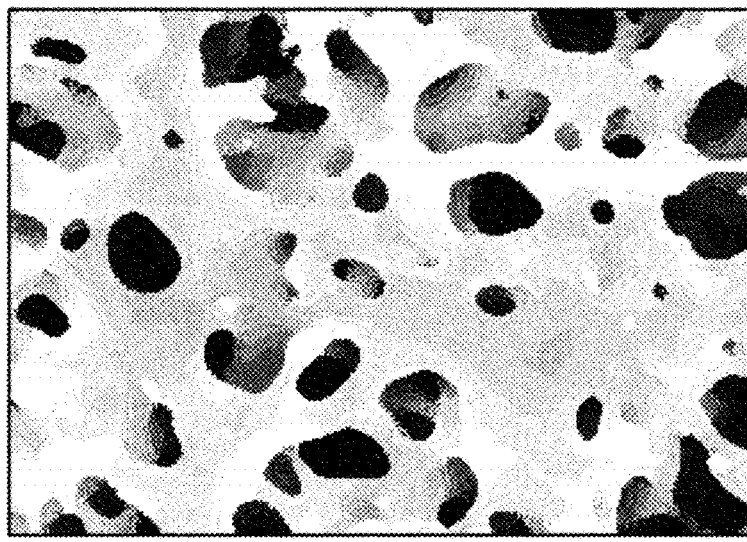
FIG. 2 is a schematic diagram illustrating a membrane structure of the porous hollow fiber membrane in FIG. 1.

The separation layer 11 includes a thermoplastic resin. The inner structure including an outer surface of the porous hollow fiber membrane 10 where the separation layer 11 is formed has a three-dimensional network structure as illustrated in FIG. 2, rather than a spherocrystal structure. The three-dimensional network structure provides higher tensile elongation at break in the porous hollow fiber membrane 10 and higher resistance to acids, alkalis (such as an aqueous sodium hydroxide solution), oxidant and the like, that are often used as a cleaning agent of membranes.

Examples of the thermoplastic resin of the separation layer 11 may include polyolefins, copolymers of olefin and olefin halide, polyolefin halides, or mixtures thereof. Specific examples of such thermoplastic resins may include polyethylene, polypropylene, polyvinyl alcohol, ethylene-vinyl alcohol copolymer, ethylene-tetrafluoroethylene (ETFE) copolymer, ethylene-monochlorotrifluoroethylene (ECTFE) copolymer, copolymer of vinylidene fluoride, ethylene, trifluoroethylene (VDF-TriFE), polyvinylidene fluoride (which may include a domain of hexafluoropropylene), or mixtures thereof. Since these materials are thermoplastic and thus have good handleability as well as high strength, they are excellent membrane materials. Among them, homopolymers and copolymers of vinylidene fluoride, ethylene, tetrafluoroethylene, chlorotrifluoroethylene, hexafluoropropylene and vinyl fluoride, or mixtures of these homopolymers and/or copolymers are preferred for their excellent mechanical strength and chemical strength (chemical resistance), as well as good formability. More specific examples include fluorine resins, such as polyvinylidene fluoride, vinylidene fluoride-hexafluoropropylene copolymer, ethylene-tetrafluoroethylene copolymer, and ethylene-chlorotrifluoroethylene copolymer.

It should be noted that the separation layer 11 contains a component other than the thermoplastic resin (impurities and the like). The separation layer 11 may contain components other than the thermoplastic resin in an amount up to about 5% by mass. For example, the separation layer 11 contains non-solvents used during production as described later. These non-solvents can be detected by pyrolysis GC-MS (gas chromatography mass spectrometry).

In this embodiment, a non-solvent is an organic liquid that does not uniformly dissolve a thermoplastic resin of one-quarter mass at a boiling point. That is, a non-solvent is an organic liquid that does not uniformly dissolve a thermoplastic resin at a boiling point of the organic liquid in a mixture containing the thermoplastic resin and the organic liquid at a mass ratio of 20:80. As a non-solvent, an organic liquid having the above described properties is selected according to the thermoplastic resin applied to the porous hollow fiber membrane 10. The refractive index and the like can be used to determine the dissolved state. For example, in the dissolved state, when a thermoplastic resin and an organic liquid are put in a glass test tube, the same refractive index is obtained wherever in the mixture is measured. In a non-dissolved state, the mixture separates into two layers which respectively indicate refractive indexes different from each other.

The non-solvent may consist of a plurality of solvents. When the non-solvent contains a plurality of solvents, it may contain a first organic liquid and a second organic liquid. It should be noted that the first organic liquid alone is a non-solvent with respect to the thermoplastic resin. The second organic liquid alone is a poor solvent or a good solvent with respect to the thermoplastic resin.

In this embodiment, the poor solvent is an organic liquid that does not uniformly dissolve a thermoplastic resin of one-quarter mass at 25° C. and uniformly dissolves the thermoplastic resin at least at a boiling point. That is, the poor solvent is an organic liquid that does not uniformly dissolve the thermoplastic resin at 25° C., and uniformly dissolves the thermoplastic resin at 100° C. or more and below the boiling point of the organic liquid, in a mixture containing the thermoplastic resin and the organic liquid at a ratio of 20:80. As a poor solvent, an organic liquid having the above described properties is selected according to the thermoplastic resin applied to the porous hollow fiber membrane 10.

In this embodiment, the good solvent is an organic liquid that uniformly dissolves a thermoplastic resin at 25° C. As a good solvent, an organic liquid having the above described properties is selected according to the thermoplastic resin applied to the porous hollow fiber membrane 10.

The first organic liquid is at least one selected from sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils.

The second organic liquid is different from the first organic liquid, and is at least one selected from sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils.

Examples of the C6-C30 fatty acids include capric acid, lauric acid, oleic acid, and the like. Examples of the epoxidized vegetable oils may, include epoxidized soybean oil, epoxidized linseed oil, and the like. The above described solvents are compatible with additives and have low toxicity.

A mixed liquid of the first organic liquid and the second organic liquid is a non-solvent in a mixture containing a thermoplastic resin and the mixed liquid at a ratio of 20:80, and thus does not dissolve a thermoplastic resin even at a boiling point of the mixed liquid.

The non-solvent may also be a single solvent.

In this embodiment, when ethylene-chlorotrifluoroethylene copolymer is used as a thermoplastic resin, for example, a non-solvent is at least one selected from sebacic acid esters, acetyl citric acid esters, citric acid esters, adipic acid esters, trimellitic acid esters, oleic acid esters, palmitic acid esters, stearic acid esters, phosphoric acid esters, phosphorous esters, C6-C30 fatty acids and epoxidized vegetable oils, or mixtures thereof. When ethylene-chlorotrifluoroethylene copolymer is used as a thermoplastic resin, the non-solvent is preferably an organic liquid selected from stearic acid esters, phosphoric acid esters and C6-C30 fatty acids.

Examples of the C6-C30 fatty acids include capric acid, lauric acid, oleic acid, and the like. Examples of the epoxidized vegetable oils may include epoxidized soybean oil, epoxidized linseed oil, and the like. The above described solvents are compatible with additives and have low toxicity.

When the non-solvent is a single solvent, the separation layer 11 may further contain a poor solvent. For example, in this embodiment, when ethylene-chlorotrifluoroethylene copolymer is used as a thermoplastic resin, examples of poor solvent may include, for example, triphenyl phosphate, oleic acid, and the like.

The separation layer 11 may further contain an additive as a component other than the thermoplastic resin. The additive may preferably be hydrophobic for excellent compatibility with thermoplastic resin and the above described non-solvents. Inorganic material may be used as the additive.

The inorganic material may be an inorganic compound. The inorganic compound may preferably be inorganic fine powders. Examples of inorganic fine powders may include silica (including fine powder silica), titanium oxide, lithium chloride, calcium chloride, and the like. Among them, fine powder silica is preferable in view of cost.

In this embodiment, the support layer 12 is a porous body consisting of fluorine resin. The fluorine resin is vinylidene fluoride-hexafluoropropylene homopolymer or copolymer or mixtures thereof, ethylene-tetrafluoroethylene copolymer, ethylene-chlorotrifluoroethylene copolymer, or mixtures of the above described fluorine resins.

(Physical Properties of Porous Hollow Fiber Membrane 10)

Physical properties of the porous hollow fiber membrane 10 according to this embodiment will be described below.

The porous hollow fiber membrane 10 has an initial value of tensile elongation at break of preferably 60% or more, more preferably 80% or more, still more preferably 100% or more, and particularly preferably 120% or more. The tensile elongation at break can be measured using the measurement method in the Examples described later.

Alkali resistance can be measured using ratios of elongation at break before and after alkali immersion. For example, the porous hollow fiber membrane 10 preferably retains, after immersion in a 4% aqueous NaOH solution for ten days, a tensile elongation at break of 60% or more of the initial value of the tensile elongation at break, more preferably 65% or more, and still more preferably 70% or more.

From a practical point of view, the porous hollow fiber membrane 10 has a compression strength of 0.2 MPa or more, preferably 0.3 to 1.0 MPa, and more preferably 0.4 to 1.0 MPa. In the compression strength measurement, pure water permeation amount by the external pressure is measured, the pressure is raised at intervals of 0.05 MPa, and the pressure at which the pressure and the pure water permeation amount are not proportional any more is determined as crush of membrane, then the pressure immediately before that is regarded as the compression strength.

The surface of the porous hollow fiber membrane 10 has an open fraction (surface open fraction) of 20 to 60%, preferably 25 to 50%, and more preferably 25 to 45%. Use of a membrane having a surface open fraction of 20% or more on the side to be in contact with a liquid to be treated allows for reduction in both degradation of water permeability due to clogging, degradation of water permeability due to chafing of the membrane surface, and increase in filtration stability. The open fraction can be measured by the measurement method used in the Examples described below.

When the pore diameter is excessively large even if the open fraction is high, the desired separation performance may not be achieved. For this reason, the pore diameter on the outer surface is 1,000 nm or less, preferably 10 to 800 nm, and more preferably 100 to 700 nm. When the pore diameter is 1,000 nm or less, the components desired to be blocked contained in the liquid to be treated can be blocked, and when the pore diameter is 10 nm or more, sufficiently high water permeability can be ensured. The pore diameter can be measured by the measurement method in the Examples described later.

When the porous hollow fiber membrane 10 is in the form of a single layer membrane of the separation layer 11, the porous hollow fiber membrane 10 has a thickness of preferably 80 to 1,000 μm, and more preferably 100 to 300 μm. When the thickness is 80 μm or more, strength can be increased, and when the thickness is 1,000 μm or less, pressure loss due to membrane resistance can be reduced. When the porous hollow fiber membrane 10 is in the form of a multilayer porous hollow fiber membrane including the support layer 12, the separation layer 11 has a thickness of preferably 1 to 100 μm, and the support layer 12 has a thickness of preferably 80 to 1,000 μm. When the thickness of the separation layer 11 is 1 μm or more, separation properties can be exhibited easily, and when the thickness is 100 μm or less, the water permeability is not easily reduced. When the support layer 12 has a thickness of 80 μm or more, strength can be increased, and when the thickness thereof is 1,000 μm or less, pressure loss due to membrane resistance can be reduced.

The porous hollow fiber membrane 10 has a porosity of preferably 50 to 80%, and more preferably 55 to 65%. The porosity being 50% or more allows providing high water permeability, and the porosity being 80% or less allows providing high mechanical strength. In this embodiment, the porosity is determined according to the following equation.

Porosity [%]=100×{(wet membrane weight [g])−(dry membrane weight [g])}/(membrane volume [cm$^3$])

In this embodiment, the wet membrane means a membrane in such a state that the pores are filled with water, but the hollow portions do not contain water. Specifically, the wet membrane can be obtained by immersing a sample membrane of 10 to 20 cm in length in ethanol to fill the pores with ethanol, then immersing the membrane in water repeatedly 4 to 5 times to sufficiently replace the content in the pores with water, then holding one end of the hollow fiber membrane after replacement and shaking the membrane well about 5 times, and furthermore holding another end of the hollow fiber membrane and again shaking it well about 5 times to remove water in the hollow portions. The dry membrane can be obtained by drying the wet membrane after being subjected to a measurement of weight in an oven at 80° C. until the membrane reaches constant weight. The membrane volume is obtained by the following equation.

Membrane volume [cm$^3$]=π×{(outer diameter [cm]/2)$^2$−(inner diameter[cm]/2)$^2$}×(membrane length [cm]).

The porous hollow fiber membrane 10 may be in the form of an annular single-layer membrane. However, the porous hollow fiber membrane 10 may be in the form of a multilayer membrane including a separation layer 11 and a support layer 12 supporting the separation layer 11, the pore diameters of these layers being different from each other. The outer surface and the inner surface of the porous hollow fiber membrane 10 may have a modified cross-section structure, such as a cross-section structure including protrusions.

(Liquid to be Treated)

Liquids to be treated with the porous hollow fiber membrane 10 include turbid water and process liquids. The porous hollow fiber membrane 10 is suitably used in water purification methods that include filtering turbid water.

The turbid water refers to natural water, domestic drainage, and treated water of them. Examples of the natural water include river water, lake water, groundwater, and sea water. The turbid water to be treated also includes treated water of natural water subjected to a treatment, such as sedimentation, sand filtration, coagulating-sedimentation sand filtration, ozone treatment, and activated carbon treatment. An example of the domestic drainage is sewage water. Examples of the turbid water to be treated also include primary treated water of sewage water subjected to screen filtration or sedimentation, secondary treated water of sewage water subjected to biotreatment, and even tertiary treated (highly treated) water of sewage water subjected to a treatment, such as coagulating-sedimentation sand filtration, activated carbon treatment, and ozone treatment. Such turbid water contains minute suspensoids on the order of μm or less including organic substances, inorganic substances, and organic-inorganic mixtures (such as humic colloid, organic colloid, clay, and bacteria).

Water quality of the turbid water such as the above-described natural water, domestic drainage, and treated water of them can generally be expressed using one of or combination of turbidity and concentration of organic substances, which are representative water quality indexes. According to the turbidity (average turbidity rather than instant turbidity), the water quality can be roughly classified, for example, into low-turbidity water with a turbidity of less than 1, medium-turbidity water with a turbidity of 1 or more and less than 10, high-turbidity water with a turbidity of 10 or more and less than 50, and ultrahigh-turbidity water with a turbidity of 50 or more. According to the concentration of organic substances (Total Organic Carbon (TOC)): mg/L) (average value rather than instant value), the water quality can be roughly classified, for example, into low-TOC water with a TOC of less than 1, medium-TOC water with a TOC of 1 or more and less than 4, high-TOC water with a TOC of 4 or more and less than 8, and ultrahigh-TOC water with a TOC of 8 or more. Basically, water with higher turbidity or TOC is more likely to cause clogging of the filtration membrane, and therefore the effect of using the porous hollow fiber membrane 10 is higher for water with a higher turbidity or a TOC.

The process liquid refers to a liquid to be separated in a process separating a valuable material and invaluable materials during production of food, drug, semiconductor, etc. In food production, the porous hollow fiber membrane 10 is used to separate liquor such as, sake or wine from yeast, In drug production, the porous hollow fiber membrane 10 is used, for example, for sterile filtration during purification of protein. In semiconductor production, the porous hollow fiber membrane 10 is used, for example, to separate an abrasive from water in polishing wastewater.

In each region of a total of four fields of view including, in an SEM image of a membrane cross-section in a membrane thickness direction orthogonal to an inner surface of the porous hollow fiber membrane 10, a field of view including the inner surface, a field of view including an outer surface of the porous hollow fiber membrane 10 and two fields of view taken at equal intervals between these fields of view, the porous hollow fiber membrane 10 according to this embodiment may preferably be any one of the following: a sum of areas of resin portions each having an area of 1 $\mu m^2$ or less is 70% or more to a total area of the resin portions; a sum of areas of resin portions each having an area of 10 $\mu m^2$ or more is 15% or less to a total area of the resin portions; and a sum of areas of resin portions each having an area of 1 $\mu m^2$ or less is 70% or more to a total area of the resin portions and a sum of areas of resin portions each having 10 $\mu m^2$ or more is 15% or less to a total area of the resin portions. More preferably, in the porous hollow fiber membrane 10, a sum of areas of resin portions each having an area of 1 $\mu m^2$ or less is 70% or more to a total area of the resin portions, a sum of areas of resin portions each having an area over 1 $\mu m^2$ and less than 10 $\mu m^2$ is 15% or less to a total area of the resin portions, and a sum of areas of resin portions each having an area of 10 $\mu m^2$ or more is 15% or less to a total area of the resin portions.

Figure 3:
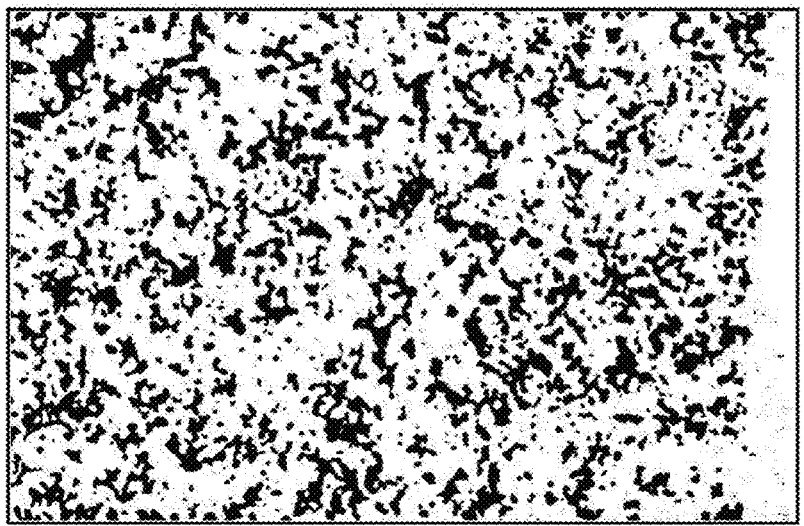
FIG. 3 is an example of an SEM image illustrating a cross-section of the porous hollow fiber membrane in FIG. 1 (the black portions indicate resins and the white portions indicate pores (openings))

FIG. 3 is an example of an SEM image illustrating a cross-section of the porous hollow fiber membrane 10 according to this embodiment. This SEM image is obtained through binarization of an SEM image picture obtained by taking an image of a specific field of view in a region closest to an inner side of a total of four fields of view including, in an SEM image of a membrane cross-section in a membrane thickness direction orthogonal to an inner surface of the porous hollow fiber membrane 10, a field of view including the inner surface, a field of view including an outer surface of the porous hollow fiber membrane 10 and two fields of view taken at equal intervals between these fields of view.

It should be noted that, in the above described each region, difference in existence distribution of resin portions, that is, the anisotropy of pore communicability, can be substantially ignored between the membrane cross-section in the membrane thickness direction orthogonal to the inner surface of the porous hollow fiber membrane 10 and the cross-section parallel to the inner surface.

Herein the term "resin portion" is a dendritic skeleton portion of a three-dimensional network structure formed of resin, and forms a number of pores in the porous hollow fiber membrane 10. In FIG. 3, the resin portions are indicated in black and the pores are indicated in white.

Communicating pores communicating from the inside to the outside of the membrane while bending are formed in the porous hollow fiber membrane 10. When a sum of areas of resin portions each having an area of 1 $\mu m^2$ or less is 70% or more to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view, pore communicability is high (i.e. a ratio of communicating pores existing in the membrane is high). Thus, flux (amount of permeated water, water permeability) of the liquid to be treated is high, retention of permeated water after cleaning is high, and damage to the membrane after chemical cleaning represented by tensile elongation at break can be reduced. However, when a ratio of the sum of areas of resin portions each having an area of 1 $\mu m^2$ or less to a total area of the resin portions is too high, a dendritic skeleton portion of a three-dimensional network structure formed of resin, which forms a number of pores in the porous hollow fiber membrane 10 becomes too thin. Therefore, while a sum of areas of resin portions each having an area of 1 $\mu m^2$ or less is maintained to be 70% or more to a total area of the resin portions, it is preferable that a sum of areas of resin portions each having an area over 1 $\mu m^2$ be 2% or more and 30% or less to a total area of the resin portions, it is more preferable that a sum of areas of resin portions each having an area of 10 $\mu m^2$ or more be 15% or less to a total area of the resin portions, and it is still preferable that a sum of areas of resin portions each having an area of over 1 $\mu m^2$ and less than 10 $\mu m^2$ be 15% or less to a total area of the resin portions and a sum of areas of resin portions each having an area of 10 $\mu m^2$ or more be 2% or more and 15% or less to a total area of the resin portions. If a sum of areas of resin portions each having an area over 1 $\mu m^2$ is 2% or more and 30% or less to a total area of the resin portions, since the dendritic skeleton portion of a three-dimensional network structure formed of resin is not too thin, the strength and the tensile elongation at break of the porous hollow fiber membrane 10 can be suitably maintained.

Figure 4:
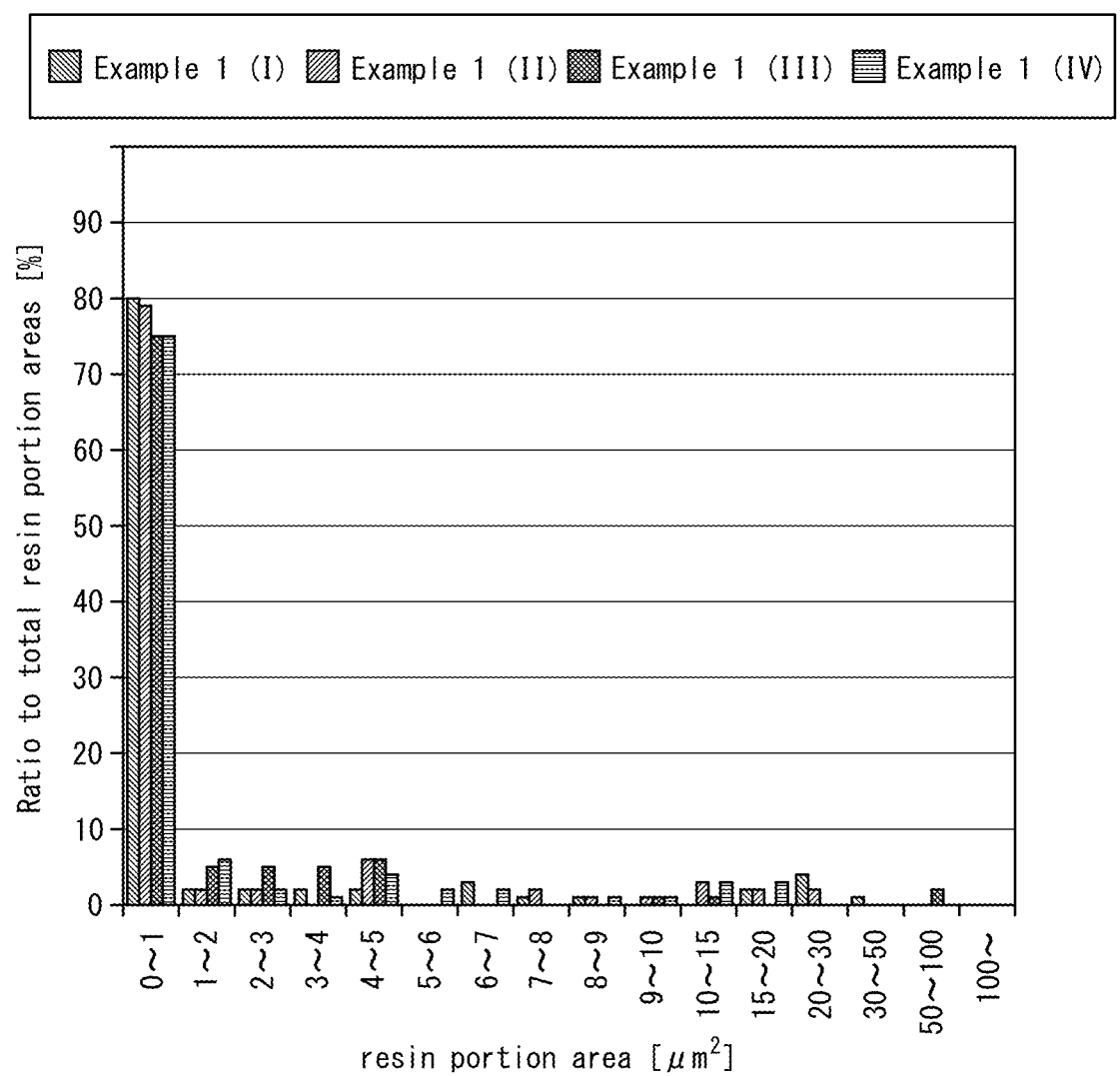
FIG. 4 is a histogram illustrating a ratio (%) of a sum of areas of resin portions each having a predetermined area to a total area of the resin portions in each region ((I) to (IV)) of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view, used by Example 1.
Figure 5:
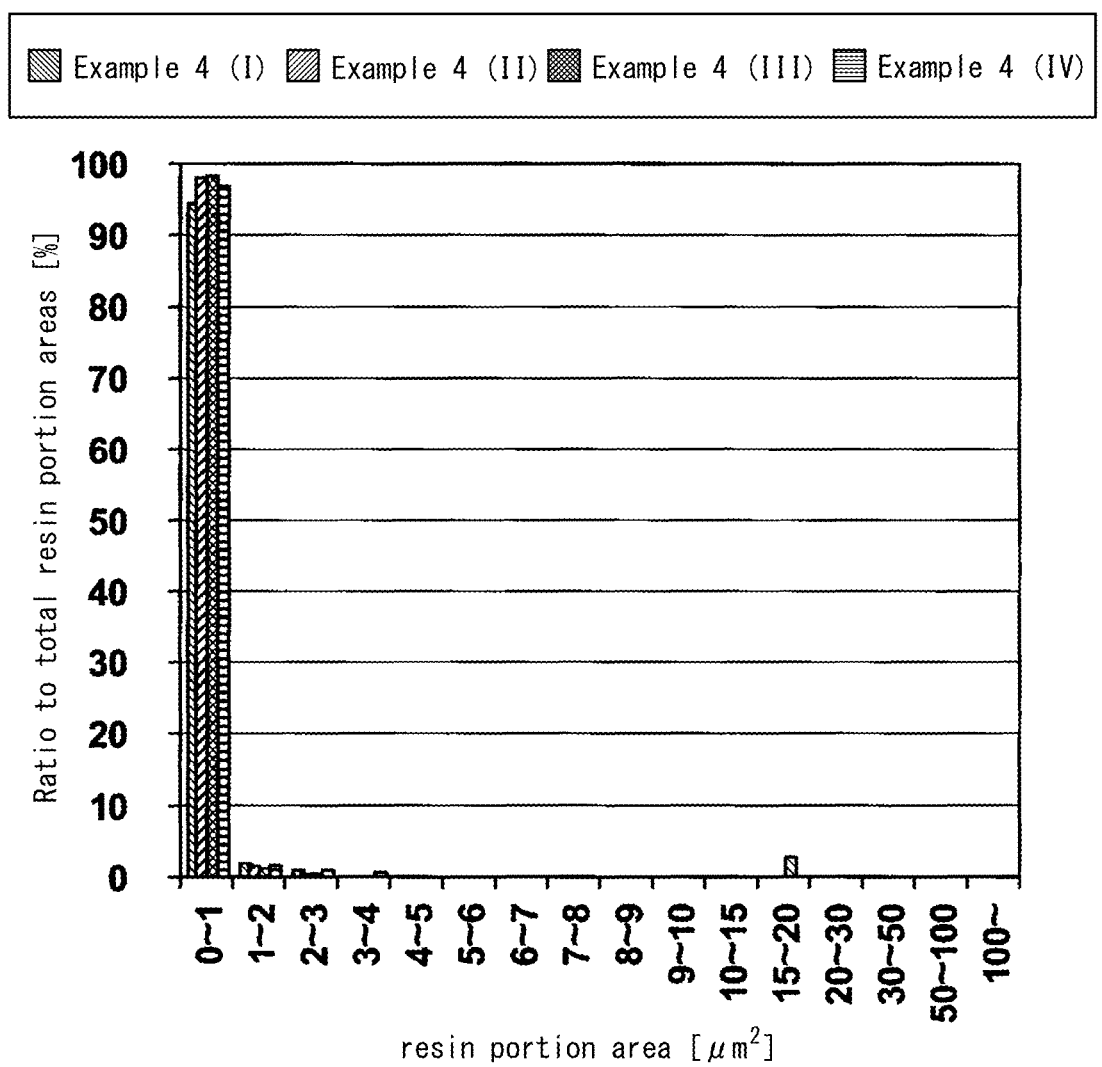
FIG. 5 is a histogram illustrating a ratio (%) of a sum of areas of resin portions each having a predetermined area to a total area of the resin portions in each region ((I) to (IV)) of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view, used by Example 4.
Figure 6:
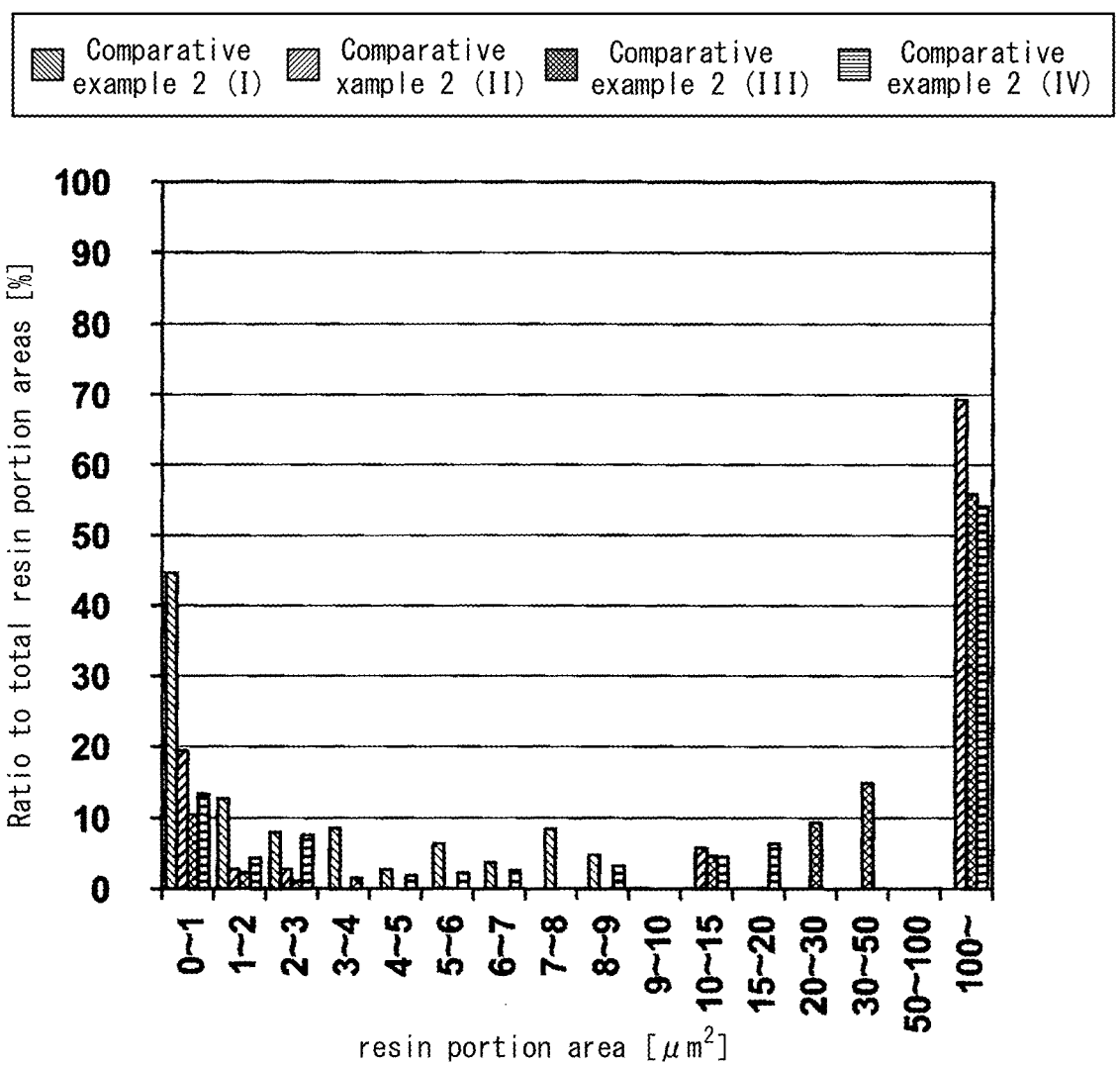
FIG. 6 is a histogram illustrating a ratio (%) of a sum of areas of resin portions each having a predetermined area to a total area of the resin portions in each region ((I) to (IV)) of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view, used by Comparative Example 2.

FIGS. 4 to 6 are histograms each illustrating a ratio (%) of a sum of areas of resin portions each having a predetermined area to a total area of the resin portions in each region ((I) to (IV)) of a total of four fields of view including, in an SEM image of a membrane cross-section in a membrane thickness direction orthogonal to an inner surface of the porous hollow fiber membrane 10 used by Example 1, Example 4 and Comparative example 2, a field of view including the inner surface, a field of view including an outer surface of the porous hollow fiber membrane 10 and two fields of view taken at equal intervals between these fields of view. In FIG. 3, the resin portions appear in a granular form. Areas of resin portions in a granular form are each measured, and with respect to each area of resin portion in a granular form, a ratio of each area to a total area of the resin portions in a field of view of a predetermined size in each region is indicated as histograms illustrated in FIGS. 4 to 6. In FIGS. 4 to 6, I is a symbol indicating a region closest to the inner side of a total of four fields of view, and IV is a symbol indicating a region closest to the outer side thereof, the four fields of view including, in an SEM image of a membrane cross-section in a membrane thickness direction orthogonal to an inner surface of the porous hollow fiber membrane 10, a field of view including the inner surface, a field of view including an outer surface of the porous hollow fiber membrane and two fields of view taken at equal intervals between these fields of view.

For example, I of Example 1 is a histogram of an image of a field of view having a predetermined size in an innermost region of the porous hollow fiber membrane of Example 1. A measurement method of area distribution of resin portions in each region of the porous hollow fiber membrane will be described later.

<Method for Producing Porous Hollow Fiber Membrane 10>

Next, a method for producing the porous hollow fiber membrane 10 will be described. The method for producing the porous hollow fiber membrane 10 includes the steps of: (a) preparing a melt-kneaded product; (b) feeding the melt-kneaded product to a multiple-structure spinning nozzle and extruding the melt-kneaded product through the spinning nozzle to obtain a hollow fiber membrane; (c) extracting a non-solvent from the hollow fiber membrane; and (d) extracting inorganic fine powder from the hollow fiber membrane. When a porous hollow fiber membrane including further the support layer 12 is produced, the separation layer 11 and the support layer 12 each includes steps (a) and (b), in which a triple tubular spinning nozzle is used and a melt-kneaded product, which will be the separation layer 11 and the support layer 12, is extruded into an outermost tube and a middle tube of the triple tube, and a hollow forming agent is poured into an inner tube to form a hollow portion.

It should be noted that, when a hollow fiber membrane is obtained in the step (b), phase separation may preferably be liquid-liquid phase separation, that is similar to the thermally induced phase separation.

Further, in each of steps (c) and (d), a non-solvent and inorganic fine powder are extracted from the hollow fiber membrane, and the hollow fiber membrane after extraction includes a non-solvent and inorganic fine powder as residues.

As an extracting agent used in the step (c), a liquid, such as methylene chloride or various alcohols, that does not dissolve a thermoplastic resin and has high affinity with plasticizer is preferably used.

As an extracting agent used in the step (d), a liquid, such as hot water, or an acid or alkali that can dissolve the additive used but does not dissolve a thermoplastic resin is preferably used.

Next, the step of (a) preparing the melt-kneaded product of the method for producing the porous hollow fiber membrane 10 of this embodiment is described in detail.

The above described step (a) includes causing an inorganic compound to absorb the non-solvent for powderization and melt-kneading the powder and a thermoplastic resin. Therefore, the melt-kneaded product contains three components such as a thermoplastic resin, a non-solvent and inorganic fine powder.

In this embodiment, as the thermoplastic resin used in the step (a), for example, polyolefins, copolymers of an olefin and a olefin halide, polyolefin halides, or mixtures thereof are used as described above. Specific examples of the above described thermoplastic resins include, for example, polyethylene, polypropylene, polyvinyl alcohol, ethylene-vinyl alcohol copolymer, ethylene-tetrafluoroethylene copolymer, polyvinylidene fluoride (which may include a domain of hexafluoropropylene), or mixtures thereof. Since these materials are thermoplastic and thus have excellent handleability as well as high strength, they are excellent membrane materials. Among them, homopolymers and copolymers of vinylidene fluoride, ethylene, tetrafluoroethylene, and chlorotrifluoroethylene, or mixtures of these homopolymers and/or copolymers are preferred for their excellent mechanical strength and chemical strength (chemical resistance), as well as good formability. More specifically, fluorine resins, such as polyvinylidene fluoride, vinylidene fluoride-hexafluoropropylene copolymer, ethylene-tetrafluoroethylene copolymer, and ethylene-chlorotrifluoroethylene copolymer may preferably be used.

The thermoplastic resin in the melt-kneaded product has a concentration of preferably 20 to 60% by mass, more preferably 25 to 45% by mass, and still more preferably 30 to 45 by mass. The concentration being 20% by mass or more allows providing higher mechanical strength, and the concentration being 60% by mass or less allows providing higher water permeability.

In this embodiment, when a mixed liquid, which is a non-solvent as a whole, contains a first organic liquid and a second organic liquid, it is preferable that a non-solvent to the thermoplastic resin be used as a first organic liquid used for the step (a). It is also preferable that, as a second organic liquid used for the step (a), a good solvent or a poor solvent to the thermoplastic resin be used. In the step (a), a non-solvent to the thermoplastic resin is mixed into a good solvent or a poor solvent. When a non-solvent is used for a raw material of the membrane, a porous hollow fiber membrane 10 having a three-dimensional network structure can be obtained. Although the mechanism is not perfectly clear, it is believed that use of a solvent mixed with a non-solvent to reduce the solubility moderately hinders crystallization of the polymer, and this promotes formation of a three-dimensional network structure. The concentration of the first organic liquid in the melt-kneaded product is preferably 10 to 60% by mass. The concentration of the second organic liquid in the melt-kneaded product is preferably 20 to 50% by mass.

As described above, according to the thermoplastic resin for a raw material of the hollow fiber membrane 10, a non-solvent and a poor solvent or a good solvent are selected, for example, from sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils.

An organic liquid that can dissolve a thermoplastic resin in a temperature range from 25° C. to 100° C. is referred to as a good solvent, an organic liquid that can dissolve a thermoplastic resin in a temperature range from 100° C. to the boiling point is referred to as a poor solvent, and an organic liquid that cannot dissolve a thermoplastic resin at the boiling point or higher is referred to as a non-solvent. In this embodiment, a good solvent, a poor solvent and a non-solvent can be determined as follows.

A good solvent applicable as the second organic liquid is at least one selected from various esters such as sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids and epoxidized vegetable oils, and is an organic liquid that uniformly dissolves the thermoplastic resin in a mixed liquid obtained by mixing the solvent four times the mass of the thermoplastic resin at any temperature in a range from higher than 25° C. to the boiling point or lower.

A poor solvent applicable as the second organic liquid is at least one selected from various esters such as sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils, and is an organic liquid that does not uniformly dissolve the thermoplastic resin in a mixed liquid obtained by mixing the solvent four times the mass of the thermoplastic resin at 25° C. and uniformly dissolves the thermoplastic resin in the mixed liquid at any temperature in a range from higher than 100° C. to the boiling point or lower.

A non-solvent applicable as the first organic liquid is at least one selected from various esters such as sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils, and is an organic liquid that does not uniformly dissolve the thermoplastic resin in a mixed liquid obtained by mixing the solvent four times the mass of the thermoplastic resin at the boiling point.

Specifically, whether the solvent is a good solvent, a poor solvent, or a non-solvent is determined as follows. A thermoplastic resin in an amount of about 2 g and an organic liquid in an amount of about 8 g are put in a test tube, which is heated using a test tube block heater to the boiling point of the organic liquid with intervals of about 10° C., and a mixture in the test tube is mixed using a spatula or the like. Then whether the solvent is a good solvent, a poor solvent, or a non-solvent is determined based on solubility at temperatures in the above-described ranges. That is, a solvent that dissolves the thermoplastic resin is a good solvent or a poor solvent, and a solvent that does not dissolve the thermoplastic resin is a non-solvent.

Boiling points of some of the esters described above as examples of the first organic liquid and the second organic liquid are as follows. Acetyl tributyl citrate has a boiling point of 343° C., dibutyl sebacate has a boiling point of 345° C., dibutyl adipate has a boiling point of 305° C., di-isobutyl adipate has a boiling point of 293° C., bis (2-ethylhexyl) adipate has a boiling point of 335° C., diisononyl adipate has a boiling point of 250° C. or more, diethyl adipate has a boiling point of 251° C., triethyl citrate has a boiling point of 294° C., and triphenyl phosphite has a boiling point of 360° C.

For example, in the case where polyvinylidene fluoride (PVDF) is used as the thermoplastic resin and acetyl tributyl citrate, dibutyl sebacate or dibutyl adipate is used as the organic liquid, PVDF is not uniformly dissolved in these solvents at 25° C., and when the temperature of mixed liquid is raised, PVDF is uniformly mixed and dissolved in the solvent at any temperature in a range from higher than 100° C. to the boiling point or lower. Therefore, acetyl tributyl citrate, dibutyl sebacate and dibutyl adipate are poor solvents to PVDF. On the other hand, in the case where bis (2-ethylhexyl) adipate, diisononyl adipate, his (2-ethylhexyl) sebacate or an oleic acid is used as the organic liquid, PVDF is not dissolved even at the boiling point thereof. Therefore, bis (2-ethylhexyl) adipate, diisononyl adipate and bis (2-ethylhexyl) sebacate and oleic acid are non-solvents to PVDF.

Further, in the case where ethylene-tetrafluoroethylene copolymer (ETFE) is used as the thermoplastic resin and diethyl adipate is used as the organic liquid to be mixed, ETFE is not uniformly dissolved at 25° C., and is uniformly mixed and dissolved at any temperature in a range from 100° C. or higher and the boiling point or lower. Therefore diethyl adipate is a poor solvent to ETFE. On the other hand, in the case where bis (2-ethylhexyl) adipate, diisononyl adipate, or a capric acid is used as the organic liquid, ETFE is not dissolved. Therefore, bis (2-ethylhexyl) adipate, diisononyl adipate and capric acid are non-solvents to ETFE.

Further, in the case where ethylene-monochlorotrifluoroethylene copolymer (ECTFE) is used as the thermoplastic resin and triethyl citrate or bis (2-ethylhexyl) adipate is used as the organic liquid to be mixed, ECTFE is not uniformly dissolved at 25° C. and ECTFE is uniformly dissolved at any temperature in a range from 100° C. or higher and the boiling point or lower. Therefore, triethyl citrate and bis (2-ethylhexyl) adipate are poor solvents to ECTFE. On the other hand, in the case where triphenyl phosphite or an oleic acid is used as the organic liquid, ECTFE is not dissolved. Therefore triphenyl phosphite and an oleic acid are non-solvents to ECTFE.

Further, in the case where polyethylene (PE) is used as the thermoplastic resin and dibutyl sebacate is used as the organic liquid to be mixed, PE is not uniformly dissolved at 25° C., and PE is uniformly mixed and dissolved at any temperature in a range from 100° C. or higher to the boiling point or lower. Therefore dibutyl sebacate is a poor solvent to PE. On the other hand, in the case where his (2-ethylhexyl) adipate or acetyl tributyl citrate is used as the organic liquid, PE is not dissolved. Therefore bis (2-ethylhexyl) adipate and acetyl tributyl citrate are non-solvents to PE.

In this embodiment, when a non-solvent contains a single solvent, as a non-solvent used for the step (a), among at least one selected from sebacic acid esters, citric acid esters, acetyl citric acid esters, adipic acid esters, trimellitic acid esters, oleic acid esters, palmitic acid esters, stearic acid esters, phosphoric acid esters, phosphorous esters, C6-C30 fatty acids and epoxidized vegetable oils or a mixture of some of them, an organic liquid that does not uniformly dissolve the thermoplastic resin of one-quarter mass at a boiling point is applied. In the case where ethylene-chlorotrifluoroethylene copolymer is applied as the thermoplastic resin, a non-solvent is preferably at least one selected from stearic acid esters, phosphorous esters and fatty acids. Concentration of the non-solvent in the melt-kneaded product is preferably 10 to 60% by mass.

In a method for producing the porous hollow fiber membrane 10 according to this embodiment in which the non-solvent contains a single solvent, a non-solvent of ethylene-chlorotrifluoroethylene copolymer is used as a raw material. When a non-solvent is used as a raw material of the membrane, a porous hollow fiber membrane having a three-dimensional network structure is obtained. Although its mechanism of action is not perfectly clear, it is believed that use of a solvent mixed with a non-solvent to reduce the solubility moderately hinders crystallization of the polymer, and this promotes formation of a three-dimensional network structure. The non-solvent alone does not mix with the ethylene-chlorotrifluoroethylene copolymer. Thus after the non-solvent is absorbed by an inorganic compound such as silica, it is mixed with polymer and melt-kneaded.

The organic liquid that is capable of dissolving the thermoplastic resin at ordinary temperatures is referred to as a good solvent, the organic liquid that is not capable of dissolving the thermoplastic resin at ordinary temperatures but is capable of dissolving the thermoplastic resin at high temperatures is referred to as a poor solvent to the thermoplastic resin, and the organic liquid that is not capable of dissolving the thermoplastic resin even at high temperatures is referred to as a non-solvent. In this embodiment, the poor solvent and the non-solvent can be determined by the method described below.

In this embodiment in which the non-solvent contains a single solvent, the non-solvent is an organic liquid that does not uniformly dissolve the thermoplastic resin in a first mixed liquid even if the temperature of the first mixed liquid is raised to the boiling point, the first mixed liquid being obtained by mixing the solvent four times the mass of the thermoplastic resin, which is ethylene-chlorotrifluoroethylene copolymer.

Further, in this embodiment in which the non-solvent contains a single solvent, the poor solvent is an organic liquid that does not uniformly dissolve the thermoplastic resin in a second mixed liquid at 25° C. but uniformly dissolves the thermoplastic resin therein at any temperature in a range from higher than 100° C. to the boiling point or lower, the second mixed liquid being obtained by mixing the solvent four times the mass of the thermoplastic resin, which is ethylene-chlorotrifluoroethylene copolymer.

Specifically, whether the solvent is a poor solvent or a non-solvent is determined as follows. Ethylene-chlorotrifluoroethylene copolymer in an amount of about 2 g and an organic liquid in an amount of about 8 g are put in a test tube, which is heated using a test tube block heater to the boiling point of the organic liquid with intervals of about 10° C., and a mixture in the test tube is mixed using a spatula or the like. Then whether the solvent is a poor solvent or a non-solvent is determined based on solubility at temperatures in the above-described ranges.

Boiling points of some of the esters described above as examples of non-solvents are as follows. Acetyl tributyl citrate has a boiling point of 343° C., dibutyl sebacate has a boiling point of 345° C., dibutyl adipate has a boiling point of 305° C., di-isobutyl adipate has a boiling point of 293° C., his (2-ethylhexyl) adipate has a boiling point of 335° C., diisononyl adipate has a boiling point of 250° C. or more, diethyl adipate has a boiling point of 251° C., triethyl citrate has a boiling point of 294° C., and triphenyl phosphite has a boiling point of 360° C.

For example, when ethylene-chlorotrifluoroethylene copolymer is used as the thermoplastic resin and triethyl citrate is used as the organic liquid to be mixed, they are uniformly mixed at about 200° C. Thus triethyl citrate is applicable as a poor solvent. On the other hand, when triphenyl phosphate or oleic acid is used as the organic liquid, ethylene-chlorotrifluoroethylene copolymer is not dissolved at the boiling points thereof, thus is applicable as a non-solvent.

In this embodiment, an additive used in the step (a) may be an inorganic material such as an inorganic compound or an organic material. When an inorganic material is used as an additive, the inorganic material is preferably inorganic fine powder. The inorganic fine powder contained in the melt-kneaded product has a primary particle size of preferably 50 nm or less, and more preferably 5 nm or more and less than 30 nm. Specific examples of the inorganic fine powder include silica (including fine powder silica), titanium oxide, lithium chloride, calcium chloride, organic clay, and the like. Among them, fine powder silica is preferred in view of cost. The "primary particle size of the inorganic fine powder" refers to a value that is found through analysis of an electron micrograph. That is, first, a batch of inorganic fine powder is pre-treated according to the method prescribed in ASTM D3849. Thereafter, diameters of 3000 to 5000 particles on a transmission electron micrograph are measured, and an arithmetic average of these values is calculated as the primary particle size of the inorganic fine powder. The material of the inorganic fine powder present in the porous hollow fiber membrane 10 can be determined by identifying elements present therein by fluorescent X-ray analysis and the like. Organic clay and the like may preferably be used when an organic material is used as additive.

The above described non-solvent, as it is, is not mixed with the thermoplastic resin. Thus, first, the inorganic fine powder is used to absorb the oil of the non-solvent to powderize the non-solvent, and the thermoplastic resin powder is mixed therewith. Further, a mixture of these non-solvent, inorganic fine powder and thermoplastic resin is melt-kneaded at about 240° C. to obtain uniform mixture thereof, which allows the thermoplastic resin to be in a melting state.

The material of the inorganic fine powder in the porous hollow fiber membrane can be determined by identifying the elements present in the inorganic fine powder by fluorescent X-ray and the like.

<Filtration Method>

The filtration method according to this disclosure includes performing filtration of the liquid to be treated using the porous hollow fiber membrane 10 of this disclosure. Using the porous hollow fiber membrane 10 of this disclosure enables highly efficient filtration.

EXAMPLES

Hereinafter this disclosure will be described in detail with reference to Examples. However, this disclosure is not limited thereto. Physical property values in Examples and Comparative Examples were calculated by the methods described below.

(1) Outer Diameter and Inner Diameter of Membrane

The hollow fiber membrane was cut into thin slices with a razor, and the outer diameter and the inner diameter thereof were measured using a 100× magnifying glass. For each sample; measurement was performed at 60 points at 30-mm intervals.

(2) Observation of Open Fraction, Pore Diameter and Membrane Structure

An electron microscope, SU8000 series, available from HITACHI was used to obtain 5000× electron microscope (SEM) images of the surface and the cross-section of each membrane with an accelerating voltage of 3 kV. The electron microscope sample of the cross-section was obtained by slicing a membrane sample that was frozen in ethanol. Subsequently, an image analysis software, Winroof6.1.3, was used to perform "noise removal" of the SEM images with a value "6", and further binarizaion was performed with a single threshold value, which is "threshold value:105." The open fraction on the membrane surface was calculated by calculating the areas occupied by pores on thus obtained binarized images.

As for pore size, an areas of each pore was added in the ascending order of a pore size, and the pore size at which the sum thereof reached 50% of the total areas of all pores was determined as the pore size.

As for membrane structure, the images of the membrane surface and the cross-section taken at 5000× were observed, and a membrane that had no spherocrystals and had polymer trunks exhibiting a three-dimensional network structure was determined as having a three-dimensional network structure.

(3) Water Permeability

Each hollow fiber membrane having a length of about 10 cm was immersed in ethanol, and then immersed in pure water several times. Thereafter, one end of the wet hollow fiber membrane was sealed; and a syringe needle was inserted into the hollow portion of the membrane through the other end to inject pure water at 25° C. into the hollow portion from the syringe needle at a pressure of 0.1 MPa, under an environment of 25° C. Then, the amount of pure water permeated to the outer surface was measured, and pure water flux was determined according to the equation below to evaluate the water permeability.

Pure water flux $[L/m^2/h]=60\times$(amount of permeated water $[L]$)/{$\pi\times$(Outer diameter of membrane $[m]$)$\times$(Effective membrane length $[m]$)$\times$(Measurement time $[min]$)}

It should be noted that, in this context, the effective membrane length refers to a net length of the membrane excluding the length of the portion in which the syringe needle is inserted.

(4) Tensile Elongation at Break (%)

Load and displacement at tensile break were measured under the following conditions. As a sample, each hollow fiber membrane was used as it is according to the method prescribed in JIS K7161.

Measuring instrument: Instron-type tensile tester (AGS-5D, available from Shimadzu Corporation)
Distance between chucks: 5 cm
Tensile speed: 20 cm/minute
The tensile elongation at break was calculated according to JIS K7161 based on the obtained results.

(5) Water Permeability Retention During Filtration of Turbid Water

The water permeability retention during filtration of turbid water is an index used to determine the degree of degradation of water permeability due to clogging (fouling). Each wet hollow fiber membrane was immersed in ethanol and then immersed in pure water several times, and was filtrated according to the external pressure method with an effective membrane length of 11 cm. First, pure water was filtered under such a filtration pressure that the pure water permeated at a rate of 10 m³ per day per outer surface area of the membrane of 1 m², and the permeated water was collected for 2 minutes. The resulting value was determined as an initial pure water permeability. Subsequently, surface stream water of a river (Fujikawa River surface stream water with a turbidity of 2.2 and a TOC concentration of 0.8 ppm), which is natural turbid water, was filtered for 10 minutes under the same filtration pressure as that in the measurement of the initial pure water permeability, and the permeated water was collected for the last 2 minutes of the filtration. The resulting value was used as a turbid water filtration permeability. The water permeability retention during filtration of turbid water was defined as the equation below. All of the operations were performed at 25° C. and a linear velocity at membrane surface of 0.5 m/second.

Water permeability retention during filtration of turbid water [%]=100×(Turbid water filtration permeability [g])/(Initial pure water permeability [g])

Each parameter in the equation is calculated as follows.

Filtration pressure={(Input pressure)+(Output pressure)}/2

Outer surface area of membrane [m²]=π×(Outer diameter of fiber [m])×(Effective membrane length [m])

Linear velocity at membrane surface [m/s]=π× (Amount of circulated water [m³/s])/{π×(Tube diameter [m])²−π×(Outer diameter of membrane [m])²}

In this measurement, the filtration pressure for the turbid water was set such that the filtration pressure was not uniform across the membranes, and that the initial pure water permeability (which is the same as the water permeability at the start of filtration of turbid water) was at a rate of 10 m³ per day per 1 m² of the outer surface area of the membrane. This is because that, in an actual water treatment or sewage water treatment, membranes are usually used in a constant rate filtration operation (where the filtration pressure is adjusted such that a fixed amount of filtered water is obtained within a fixed amount of time), and it was contemplated to allow, in this measurement using a single hollow fiber membrane, comparison of the water permeability degradation under conditions as close as possible to the conditions of the constant rate filtration operation.

(6) Chemical Resistance Test

Each porous hollow fiber membrane was wet by 100% ethanol and then replaced with pure water. Each wetted porous hollow fiber membrane was cut into a length of 10 cm, and 20 pieces of them were immersed in 500 ml of a 4% aqueous sodium hydroxide solution for ten days and kept at 40° C. Tensile elongation at break of the membrane before and after the immersion in sodium hydroxide was measured for 20 samples, and the average value thereof was calculated. An elongation retention, which is defined as 100× (Elongation after immersion)/(Elongation before immersion), was used to evaluate chemical resistance.

(7) Area Distribution of Resin Portions

The porous hollow fiber membrane was cut into an annular shape through a cross-section orthogonal to a length direction, stained with 10% phosphotungstic acid+osmium tetroxide, and embedded in epoxy resin, which was trimmed. Further, a sample cross-section thereof was subjected to BIB processing to obtain a flat and smooth cross-section, which was subjected to conductive treatment to produce a microscopic observation sample. By using an electron microscope, SU8000 series, available from HITACHI, 5000 to 30,000× electron microscope (SEM) images of the membrane cross-section of each of thus obtained microscopic observation samples were taken with an accelerating voltage of 1 kV in each region ((I) to (IV) in FIGS. 4 to 6) of the total of four fields of views. The four fields of view include a field of view including an inner surface of a membrane thickness (wall-thickness portion) cross-section, a field of view including an outer surface of the membrane and two fields of view taken at equal intervals between these fields of view. Magnification can be changed according to the average power size, and more specifically, 5,000× for the average pore diameter of 0.1 μm or more, 10,000× for the average diameter of 0.05 μm or more and less than 0.1 μm and 30,000× for the average diameter of less than 0.05 μm. The size of each field of view was 2560×1920 pixels.

ImageJ was used for image processing, and threshold processing was performed on an SEM image (Image-Adjust-Treshold: Otsu's method (Otsu was selected)) to binarize on pore portions and resin portions.

ImageJ's "Analyze Particle" command (Analyze Particle: Size 0.10-Infinity) was used to measure each size of binarized granular resin portions contained in the SEM image. The total area of all resin portions contained in the SEM image was defined as ΣS and the area of the resin portions having 1 μm² or less was defined as ΣS (<1 μm²), and ΣS (<1 μm²)/ΣS was calculated to determine a ratio of the area of the resin portions having an area of 1 μm² or less. In the same manner, a ratio of the area of the resin portions having an area of a predetermined range was calculated.

Regarding noise removal when performing binarization, the resin portions having an area of less than 0.1 μm² were removed as noise, and the resin portions having an area of 0.1 μm² or more were defined as targets for analyze. Noise removal was performed through median filter processing (Process-Filters-Median:Radius: 3.0 pixels).

Each granular resin portion whose part is missing at the edge of the SEM image was also defined as a target for measurement. "Include Holes" processing was not performed. Further, shape correction such as correcting from "snowman" shape into "flat" shape was not performed.

Example 1

A melt-kneaded product was extruded by using a double-tube spinning nozzle to obtain a porous hollow fiber membrane of Example 1. As a thermoplastic resin, 40% by mass of PVDF resin (Solef 6010 available from Solvay Specialty Polymers) was used, as an additive, 23% by mass of fine powder silica (R972 available from Japan Aerosil Co., Ltd.)

was used, as a first organic liquid, 32% by mass of bis (2-ethylhexyl) adipate (DOA having a boiling point of 335° C. available from Tokyo Chemical Industry Co., Ltd.) was used, and as a second organic liquid, 5% by mass of acetyl tributyl citrate (ATBC having a boiling point of 343° C. available from Tokyo Chemical Industry Co., Ltd.) was used to prepare the melt-kneaded product. The temperature of the melt-kneaded product was about 200° C. to 250° C.

An extruded hollow fiber molded product was allowed to pass through a free traveling distance of 120 mm, and then to solidify in water at 30° C. to produce a porous hollow fiber membrane by the melt-forming method, the membrane was taken up on a reel at a speed of 5 m/minute. Thus obtained hollow fiber extrudate was immersed in isopropyl alcohol to extract and remove the bis (2-ethylhexyl) adipate and the acetyl tributyl citrate, and then was immersed in water for 30 minutes for water replacement of hollow fiber membrane. Subsequently the hollow fiber extrudate was immersed in a 20% by mass of aqueous NaOH solution at 70° C. for one hour, and repeatedly washed with water to extract and remove the fine powder silica.

Table 1 indicates the formulation, production conditions, and various performances of the obtained porous hollow fiber membrane of Example 1. The membrane structure of the porous hollow fiber membrane of Example 1 exhibited a three-dimensional network structure as illustrated in FIG. 2.

Example 2

A porous hollow fiber membrane was produced in the same manner as in Example 1, except that a melt-kneaded product was prepared by using 5% by mass of dibutyl sebacate (DBS having a boiling point of 345° C. available from Tokyo Chemical Industry Co., Ltd.) instead of 5% by mass of acetyl tributyl citrate (ATBC having a boiling point of 343° C. available from Tokyo Chemical Industry Co., Ltd.).

Table 1 indicates the formulation, production conditions, and various performances of the obtained porous hollow fiber membrane of Example 2. The membrane structure of the porous hollow fiber membrane of Example 2 exhibited a three-dimensional network structure as illustrated in FIG. 2.

Example 3

A porous hollow fiber membrane was produced in the same manner as in Example 1, except that the melt-kneaded product was prepared by using 32% by mass of diisononyl adipate (DINA having a boiling point of 250° C. available from Tokyo Chemical Industry Co., Ltd.) instead of 32% by mass of bis (2-ethylhexyl) adipate (DOA having a boiling point of 335° C.) as a first organic liquid.

Table 1 indicates the formulation, production conditions, and various performances of the obtained porous hollow fiber membrane of Example 3. The membrane structure of the porous hollow fiber membrane of Example 3 exhibited a three-dimensional network structure as illustrated in FIG. 2.

Comparative Example 1

Figure 7:
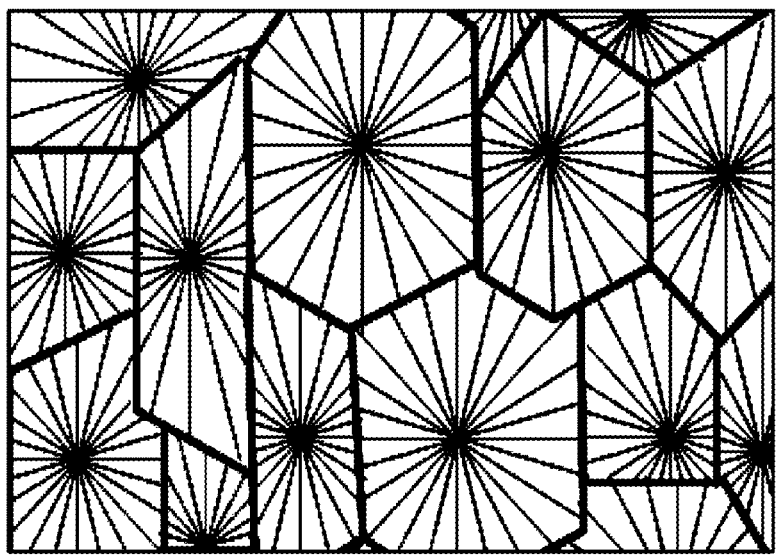
FIG. 7 is a schematic diagram illustrating a membrane structure of porous hollow fiber membranes according to Comparative Examples 1 and 2.

A hollow fiber membrane of Comparative Example 1 was obtained in the same manner as Example 1, except that PVDF resin (KF-W #1000, available from Kureha Corporation) was used and a melt-kneaded product was prepared without mixed with the first organic liquid. Table 2 indicates the formulation, production conditions, and various performances of the obtained porous hollow fiber membrane of Comparative Example 1. The porous hollow fiber membrane structure of Comparative Example 1 exhibited a spherocrystal structure illustrated in FIG. 7.

TABLE 1

|  | Example 1 | Example 2 | Example 3 |
|---|---|---|---|
| Thermoplastic resin | PVDF Solef 6010 40% by mass | PVDF Solef 6010 40% by mass | PVDF Solef 6010 40% by mass |
| Additive | Fine powder silica 23% by mass | Fine powder silica 23% by mass | Fine powder silica 23% by mass |
| First organic liquid (non-solvent) | DOA 32% by mass | DOA 32% by mass | DINA 32% by mass |
| Second organic liquid (poor solvent) | ATBC 5% by mass | DBS 5% by mass | ATBC 5% by mass |
| Discharge temperature of membrane-forming stock solution [° C.] | 240 | 240 | 240 |
| Congealed liquid | Water | Water | Water |
| Congealed liquid temperature [° C.] | 30 | 30 | 30 |
| Free traveling distance [mm] | 120 | 120 | 120 |
| Pore diameter [nm] | 400 | 350 | 450 |
| Pore structure | Three-dimensional network structure | Three-dimensional network structure | Three-dimensional network structure |
| Surface open fraction [%] | 30 | 30 | 30 |
| Water permeability [L/(m$^2$/h)] | 4,500 | 4,000 | 5,000 |
| OD/ID [mm] | 1.2/0.7 | 1.2/0.7 | 1.2/0.7 |
| Tensile elongation at break [%] | 180 | 170 | 160 |
| Elongation retention after immersion in NaOH [%] | 75 | 76 | 72 |
| Water permeability retention [%] | 77 | 78 | 74 |
| Ratio of resin portions having 1 μm$^2$ or less through image analysis (I) | 80 |  |  |
| Ratio of resin portions having 1 mm$^2$ or less through image analysis (II) | 79 |  |  |
| Ratio of resin portions having 1 μm$^2$ or less through image analysis (III) | 75 |  |  |
| Ratio of resin portions having 1 μm$^2$ or less through image analysis (IV) | 75 |  |  |
| Ratio of resin portions having 10 μm$^2$ or more through image analysis (I) | 7 |  |  |

TABLE 1-continued

|  | Example 1 | Example 2 | Example 3 |
|---|---|---|---|
| Ratio of resin portions having 10 μm$^2$ or more through image analysis (II) | 7 | | |
| Ratio of resin portions having 10 μm$^2$ or more through image analysis (III) | 3 | | |
| Ratio of resin portions having 10 μm$^2$ or more through image analysis (IV) | 6 | | |

TABLE 2

|  | Comparative Example 1 |
|---|---|
| Thermoplastic resin | PVDF KF W#1000 40% by mass |
| Additive | Fine powder silica 23% by mass |
| First organic liquid (non-solvent) | None |
| Second organic liquid (poor solvent) | ATBC 37% by mass |
| Discharge temperature of membrane-forming stock solution [°C] | 240 |
| Congealed liquid | Water |
| Congealed liquid temperature [°C.] | 30 |
| Free traveling distance [mm] | 120 |
| Pore diameter [nm] | 200 |
| Pore structure | Spherocrystal |
| Surface open fraction [%] | 20 |
| Water permeability [L/(m2/h)] | 150 |
| OD/ID [mm] | 1.2/0.7 |
| Tensile elongation at break [%] | 30 |
| Elongation retention after immersion in NaOH [%] | 15 |
| Water permeability retention [%] | 30 |
| Ratio of resin portions having 1 μm$^2$ or less through image analysis (I) | 18 |
| Ratio of resin portions having 1 μm$^2$ or less through image analysis (II) | 17 |
| Ratio of resin portions having 1 μm$^2$ or less through image analysis (III) | 15 |
| Ratio of resin portions having 1 μm$^2$ or less through image analysis (IV) | 14 |
| Ratio of resin portions having 10 μm$^2$ or more through image analysis (I) | 63 |
| Ratio of resin portions having 10 μm$^2$ or more through image analysis (II) | 68 |
| Ratio of resin portions having 10 μm$^2$ or more through image analysis (III) | 55 |
| Ratio of resin portions having 10 μm$^2$ or more through image analysis (IV) | 75 |

As indicated in Tables 1 and 2, Examples 1 to 3 demonstrated that, in the membrane formation by using the melt-forming method, a porous hollow fiber membrane having an excellent pore forming properties and high chemical resistance and mechanical strength can be produced by mixing a non-solvent in a membrane-forming stock solution.

On the other hand, in Comparative Example 1 where a non-solvent is not contained, pore has a spherocrystal structure and has less pore forming properties, chemical resistance and mechanical strength.

Example 4

A melt-kneaded product was extruded by using a double-tube spinning nozzle to obtain a porous hollow fiber membrane of Example 4. As a thermoplastic resin, 40% by mass of ethylene-chlorotrifluoroethylene copolymer (ECTFE) resin (Halar 901 available from Solvay Specialty Polymers) was used, as inorganic fine powder, 23% by mass of fine powder silica (R972 available from Japan Aerosil Co., Ltd.) was used, and as a non-solvent, 37% by mass of triphenyl phosphate (TPP having a boiling point of 360° C. available from Tokyo Chemical Industry Co., Ltd.) was used to prepare the melt-kneaded product at 240° C. to produce a porous hollow fiber membrane.

An extruded hollow fiber molded product was allowed to pass through a free traveling distance of 120 mm, and then to solidify in water at 30° C. to produce a porous hollow fiber membrane by the melt-forming method, the membrane was taken up on a reel at a speed of 5 m/minute. Thus obtained hollow fiber extrudate was immersed in isopropyl alcohol to extract and remove the non-solvent, and then was immersed in water for 30 minutes for water replacement of the hollow fiber membrane. Subsequently the hollow fiber extrudate was immersed in a 20% by mass of aqueous NaOH solution at 70° C. for one hour, and repeatedly washed with water to extract and remove the fine powder silica. The porous hollow fiber membrane structure of Example 4 exhibited a three-dimensional network structure illustrated in FIG. 2.

Example 5

A porous hollow fiber membrane was produced in the same manner as in Example 4, except that the melt-kneaded product was prepared by using 37% by mass of ethylhexyl stearate (having a boiling point of 340° C. available from Tokyo Chemical Industry Co., Ltd.) instead of 37% by mass of TPP as a non-solvent.

The porous hollow fiber membrane of Example 5 exhibited a three-dimensional network structure illustrated in FIG. 2.

Example 6

A porous hollow fiber membrane was produced in the same manner as in Example 4, except that the melt-kneaded product was prepared by using 37% by mass of oleic acid (having a boiling point of 285° C. available from Tokyo Chemical Industry Co., Ltd.) instead of 37% by mass of triphenyl phosphite (TPP having a boiling point of 360° C.) as a non-solvent.

The porous hollow fiber membrane structure of Example 6 exhibited a three-dimensional network structure illustrated in FIG. 2.

Example 7

A melt-kneaded product was extruded by using a triple-tube spinning nozzle to obtain a multilayer porous hollow fiber membrane of Example 7. For the outer layer, 34% by mass of ethylene-chlorotrifluoroethylene copolymer (ECTFE) resin (Halar 901 available from Solvay Specialty Polymers) as a thermoplastic resin, 25.4% by mass of fine powder silica (R972 available from Japan Aerosil Co., Ltd.), and 40.6% by mass of triphenyl phosphite (TPP having a boiling point of 360° C. available from Tokyo Chemical Industry Co., Ltd.) as a non-solvent were used. For the inner layer, 40% by mass of polyvinylidene fluoride resin (Solef 6010 available from Solvay Specialty Polymers) as a thermoplastic resin, 23% by mass of fine powder silica (R972 available from Japan Aerosil Co., Ltd.), 31.3% by mass of bis (2-ethylhexyl) adipate (DOA having a boiling point of 335° C. available from Tokyo Chemical Industry Co., Ltd.) as a non-solvent, and 5.7% by mass of acetyl tributyl citrate (ATBC having a boiling point of 343° C. available from Tokyo Chemical Industry Co., Ltd.) as a poor solvent were used to prepare the melt-kneaded product at 240° C. Then a porous hollow fiber membrane was produced by flowing an outer layer kneaded product, an inner layer kneaded product and air to an outermost portion, a middle portion and an innermost portion, respectively, of the triple tube.

An extruded hollow fiber molded product was allowed to pass through a free traveling distance of 120 mm, and then to solidify in water at 30° C. to produce a porous hollow fiber membrane by the melt-forming method, the membrane was taken up on a reel at a speed of 5 m/minute. Thus obtained double-layer hollow fiber extrudate was immersed in isopropyl alcohol to extract and remove the solvent, and then immersed in water for 30 minutes for water replacement of the hollow fiber membrane. Subsequently the hollow fiber extrudate was immersed in a 20% by mass of aqueous NaOH solution at 70° C. for one hour, and repeatedly washed with water to extract and remove the fine powder silica. The membrane structure of the separation layer of the porous hollow fiber membrane in Example 7 exhibited a three-dimensional network structure illustrated in FIG. 2.

Example 8

A melt-kneaded product was extruded by using a triple-tube spinning nozzle to obtain a multilayer porous hollow fiber membrane of Example 8. For the outer layer, 34% by mass of ethylene-chlorotrifluoroethylene copolymer (ECTFE) resin (Halar 901 available from Solvay Specialty Polymers) as a thermoplastic resin, 25.4% by mass of fine powder silica (R972 available from Japan Aerosil Co., Ltd.), and 40.6% by mass of ethylhexyl stearate (having a boiling point of 340° C. available from Tokyo Chemical Industry Co., Ltd.) as a non-solvent were used; and for the inner layer, 40% by mass of ethylene-tetrafluoroethylene copolymer (TL-081 available from Asahi Glass Co Ltd.) as a thermoplastic resin, 23% by mass of fine powder silica (R972 available from Japan Aerosil Co., Ltd.), 32.9% by mass of bis (2-ethylhexyl) adipate (DOA having a boiling point of 335° C. available from Tokyo Chemical Industry Co., Ltd.) as a non-solvent, and 4.1% by mass of di-isobutyl adipate (DIBA having a boiling point of 293° C. available from Tokyo Chemical Industry Co., Ltd.) as a poor solvent were used to prepare the melt-kneaded product at 240° C. Then a multilayer porous hollow fiber membrane was produced by flowing an outer layer kneaded product, an inner layer kneaded product and air to an outermost portion, a middle portion and an innermost portion, respectively, of the triple tube.

An extruded hollow fiber molded product was allowed to pass through a free traveling distance of 120 mm, and then to solidify in water at 30° C. to produce a porous hollow fiber membrane by the melt-forming method, the membrane was taken up on a reel at a speed of 5 m/minute. Thus obtained double-layer hollow fiber extrudate was immersed in isopropyl alcohol to extract and remove the solvent, and then was immersed in water for 30 minutes for water replacement of the hollow fiber membrane. Subsequently the hollow fiber extrudate was immersed in a 20% by mass of aqueous NaOH solution at 70° C. for one hour, and repeatedly washed with water to extract and remove the fine powder silica. The membrane structure of the separation layer of the porous hollow fiber membrane in Example 8 exhibited a three-dimensional network structure illustrated in FIG. 2.

Comparative Example 2

A hollow fiber membrane of Comparative Example 2 was obtained in the same manner as Example 4, except that PVDF resin (KF-W #1000, available from Kureha Corporation) was used instead of ECTFE resin as a thermoplastic resin, fine powder silica was not used and only γ-butyrolactone was used as a poor solvent to PVDF resin instead of TPP as a non-solvent. The porous hollow fiber membrane structure of Comparative Example 2 exhibited a spherocrystal structure illustrated in FIG. 7.

Tables 3 and 4 show the formulation, production conditions, and various performances of the obtained porous hollow fiber membrane of Examples and Comparative Examples.

TABLE 3

|  | Example 4 | Example 5 | Example 6 | Comparative Example 2 |
| --- | --- | --- | --- | --- |
| Resin | ECTFE Halar901 40% by mass | ECTFE Halar901 40% by mass | ECTFE Halar902 40% by mass | PVDF KF W#1000 40% by mass |
| Inorganic fine powder | Fine powder silica 23% by mass | Fine powder silica 23% by mass | Fine powder silica 23% by mass | none |
| Organic liquid | TPP 37% by mass | Ethylhexyl stearate 37% by mass | Oleic acid 37% by mass | γ-butyrolactone |
| Discharge temperature of membrane-forming stock solution [° C.] | 240 | 240 | 240 | 200 |
| Congealed liquid | Water | Water | Water | Water |
| Congealed liquid temperature [° C.] | 30 | 30 | 30 | 30 |
| Free traveling distance [mm] | 120 | 120 | 120 | 120 |
| Pore diameter [nm] | 100 | 120 | 110 | 100 |
| Pore structure | Three-dimensional network structure | Three-dimensional network structure | Three-dimensional network structure | Spherocrystal |
| Surface open fraction [%] | 25 | 25 | 25 | 20 |
| Water permeability [L/(m2/h)] | 1,000 | 1,200 | 1,300 | 2,000 |
| OD/ID [mm] | 1.2/0.7 | 1.2/0.7 | 1.2/0.7 | 1.2/0.7 |
| Compression strength [MPa] | 0.7 | 0.75 | 0.7 | 0.8 |
| Tensile elongation at break [%] | 120 | 110 | 130 | 40 |
| Water permeability retention [%] | 80 | 80 | 80 | 30 |

TABLE 3-continued

|  | Example 4 | Example 5 | Example 6 | Comparative Example 2 |
|---|---|---|---|---|
| Ratio of resin portions having 1 mm$^2$ or less through image analysis (I) | 94 |  |  | 45 |
| Ratio of resin portions having 1 mm$^2$ or less through image analysis (II) | 98 |  |  | 19 |
| Ratio of resin portions having 1 mm$^2$ or less through image analysis (III) | 98 |  |  | 10 |
| Ratio of resin portions having 1 mm$^2$ or less through image analysis (IV) | 97 |  |  | 13 |
| Ratio of resin portions having 10 mm$^2$ or more through image analysis (I) | 3 |  |  | 0 |
| Ratio of resin portions having 10 mm$^2$ or more through image analysis (II) | 0 |  |  | 75 |
| Ratio of resin portions having 10 mm$^2$ or more through image analysis (III) | 0 |  |  | 85 |
| Ratio of resin portions having 10 mm$^2$ or more through image analysis (IV) | 0 |  |  | 65 |

TABLE 4

|  | Example 7 | | Example 8 | |
|---|---|---|---|---|
|  | Outer layer | Inner layer | Outer layer | Inner layer |
| Resin | ECTFE Halar901 34% by mass | PVDF KF W#1000 40% by mass | ECTFE Halar901 34% by mass | ETFE TL-081 40% by mass |
| Inorganic fine powder | Fine powder silica 25.4% by mass | Fine powder silica 23% by mass | Fine powder silica 25.4% by mass | Fine powder silica 23% by mass |
| Organic liquid | TPP 40.6% by mass | DOA 31.3% by mass ATBC 5.7% by mass | Ethylhexyl stearate 40.6% by mass | DOA 32.9% by mass ATBC 4.1% by mass |
| Discharge temperature of membrane-forming stock solution [° C.] | 240 | | 240 | |
| Congealed liquid | Water | | Water | |
| Congealed liquid temperature [° C.] | 30 | | 30 | |
| Free traveling distance [mm] | 600 | | 300 | |
| Pore diameter [nm] | 50 | 600 | 200 | 400 |
| Pore structure | Three-dimensional network structure | Three-dimensional network structure | Three-dimensional network structure | Three-dimensional network structure |
| Surface open fraction [%] | 25 | 30 | 25 | 30 |
| Water permeability [L/(m2/h)] | 6,000 | | 4,000 | |
| Compression strength [MPa] | 0.8 | | 0.8 | |
| Tensile elongation at break [%] | 120 | | 120 | |
| Water permeability retention [%] | 90 | | 90 | |

As indicated in Table 3, Examples 4 to 8 demonstrated that, in the membrane formation by using the melt-forming method, a porous hollow fiber membrane having an excellent pore forming properties and high chemical resistance and mechanical strength can be produced by using a non-solvent as a membrane-forming stock solution.

On the other hand, in Comparative Example 2 where a non-solvent is not contained, pore has a spherocrystal structure and has less pore forming properties, chemical resistance and mechanical strength.

INDUSTRIAL APPLICABILITY

According to this disclosure, a non-solvent is contained to produce a porous hollow fiber membrane. Thus a porous hollow fiber membrane having an excellent pore forming properties and high chemical resistance and mechanical strength is provided.

REFERENCE SIGNS LIST 10 porous hollow fiber membrane
11 separation layer
12 support layer

The invention claimed is:

1. A method for producing a porous hollow fiber membrane, comprising the steps of:
mixing and melt-kneading a thermoplastic resin, a non-solvent that does not uniformly dissolve the thermoplastic resin of one-quarter mass at a boiling point or 250° C., whichever is lower, and an inorganic compound to produce a kneaded product; and
discharging the kneaded product.

2. The method for producing a porous hollow fiber membrane according to claim 1, wherein the non-solvent consists of a mixed liquid of at least one organic liquid or more.

3. The method for producing a porous hollow fiber membrane according to claim 2, wherein
the organic liquid is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils.

4. The method for producing a porous hollow fiber membrane according to claim 2, wherein the organic liquid is a non-solvent that does not uniformly dissolve the thermoplastic resin of one-quarter mass at a boiling point or 250° C., whichever is lower or a solvent that uniformly dissolves the thermoplastic resin of one-quarter mass at a boiling point or 250° C., whichever is lower.

5. The method for producing a porous hollow fiber membrane according to claim 2, wherein the second organic liquid is a solvent that uniformly dissolves the thermoplastic resin of one-quarter mass at a boiling point or 250° C., whichever is lower.

6. The method for producing a porous hollow fiber membrane according to claim 2, wherein the thermoplastic resin is a thermoplastic resin that contains, in its molecule, at least one selected from vinylidene fluoride, ethylene, chlorotrifluoroethylene, tetrafluoroethylene, hexafluoropropylene and vinyl fluoride.

7. The method for producing a porous hollow fiber membrane according to claim 1, wherein the inorganic compound is at least one selected from silica, lithium chloride and titanium oxide.

8. The method for producing a porous hollow fiber membrane according to claim 1, wherein the non-solvent is a single solvent.

9. The method for producing a porous hollow fiber membrane according to claim 8, wherein the non-solvent is at least one selected from sebacic acid esters, acetyl citric acid esters, citric acid esters, adipic acid esters, trimellitic acid esters, oleic acid esters, palmitic acid esters, stearic acid esters, phosphoric acid esters, phosphorous esters, C6-C30 fatty acids, and epoxidized vegetable oils.

10. The method for producing a porous hollow fiber membrane according to claim 8, wherein the thermoplastic resin is an ethylene-chlorotrifluoroethylene copolymer.

11. The method for producing a porous hollow fiber membrane according to claim 10, wherein the non-solvent is a plasticizer selected from stearic acid esters, phosphoric acid esters and C6-C30 fatty acids.

12. The method for producing a porous hollow fiber membrane according to claim 8, wherein the inorganic compound is at least one selected from silica, lithium chloride and titanium oxide.

13. The method for producing a porous hollow fiber membrane according to claim 1, wherein the thermoplastic resin is a fluorinated thermoplastic resin.

14. The method for producing a porous hollow fiber membrane according to claim 1, wherein the non-solvent is at least one selected from sebacic acid esters, citric acid esters, acetyl citric acid esters, adipic acid esters, trimellitic acid esters, oleic acid esters, palmitic acid esters, stearic acid esters, phosphoric acid esters, C6-C30 fatty acids, and epoxidized vegetable oils.

15. A method for producing a porous hollow fiber membrane according to claim 1, wherein the thermoplastic resin is not dissolved in the kneaded product.

16. A porous hollow fiber membrane containing a thermoplastic resin, a solvent and an inorganic compound, wherein the solvent is a non-solvent that does not uniformly dissolve the thermoplastic resin of one-quarter mass at a boiling point or 250° C., whichever is lower.

17. A filtration method comprising passing liquid through the porous hollow fiber membrane according to claim 16.

18. A porous hollow fiber membrane according to claim 16, wherein an elongation retention after immersion in NaOH is 60% or more.

19. A porous hollow fiber membrane containing a thermoplastic resin, a solvent and an inorganic compound, wherein
the thermoplastic resin is a thermoplastic resin that contains, in its molecule, at least one selected from vinylidene fluoride, chlorotrifluoroethylene, tetrafluoroethylene, hexafluoropropylene and vinyl fluoride;
the solvent is a non-solvent that does not uniformly dissolve the thermoplastic resin of one-quarter mass at a boiling point or 250° C., whichever is lower; and
a sum of areas of resin portions each having an area of 1 $\mu m^2$ or less is 70% or more to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

20. A porous hollow fiber membrane containing a thermoplastic resin, a solvent and an inorganic compound, wherein
the thermoplastic resin is a thermoplastic resin that contains, in its molecule, at least one selected from vinylidene fluoride, chlorotrifluoroethylene, tetrafluoroethylene, hexafluoropropylene and vinyl fluoride;
the solvent is a non-solvent that does not uniformly dissolve the thermoplastic resin of one-quarter mass at a boiling point or 250° C., whichever is lower; and
a sum of areas of resin portions each having an area of 10 $\mu m^2$ or more is 15% or less to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

21. A porous hollow fiber membrane containing a thermoplastic resin, a solvent and an inorganic compound, wherein
the thermoplastic resin is one of ethylene-tetrafluoroethylene, ethylene-monochlorotrifluoroethylene and vinylidene fluoride, ethylene, trifluoroethylene copolymers; and
a sum of areas of resin portions each having an area of 1 $\mu m^2$ or less is 70% or more to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

22. A porous hollow fiber membrane containing a thermoplastic resin, a solvent and an inorganic compound, wherein
the thermoplastic resin is one of ethylene-tetrafluoroethylene, ethylene-monochlorotrifluoroethylene and vinylidene fluoride, ethylene, trifluoroethylene copolymers; and
a sum of areas of resin portions each having an area of 10 $\mu m^2$ or more is 15% or less to a total area of the resin portions in each region of a total of four fields of view including, in an SEM image of a membrane cross-section in a membrane thickness direction orthogonal to an inner surface of the porous hollow fiber membrane, a field of view including the inner surface, a field of view including an outer surface of the porous hollow fiber membrane and two fields of view taken at equal intervals between these fields of view.

* * * * *

UNITED STATES PATENT AND TRADEMARK OFFICE
CERTIFICATE OF CORRECTION

| | |
|---|---|
| PATENT NO. | : 11,110,402 B2 |
| APPLICATION NO. | : 16/643041 |
| DATED | : September 7, 2021 |
| INVENTOR(S) | : Daisuke Okamura |

It is certified that error appears in the above-identified patent and that said Letters Patent is hereby corrected as shown below:

On the Title Page

Item [73], delete "ASAHI KASEI KABUSHIK KASHA, Tokyo (JP)" and insert --ASAHI KASEI KABUSHIKI KAISHA, Tokyo (JP)--.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*